US010592125B1

(12) United States Patent
Eda et al.

(10) Patent No.: US 10,592,125 B1
(45) Date of Patent: Mar. 17, 2020

(54) ENHANCED RESTRIPE MECHANISM

(71) Applicant: International Business Machines Corporation, Armonk, NY (US)

(72) Inventors: Sasikanth Eda, Vijayawada (IN); Shekhar Amlekar, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/167,037

(22) Filed: Oct. 22, 2018

(51) Int. Cl.
*G06F 3/06* (2006.01)
*G06F 16/27* (2019.01)

(52) U.S. Cl.
CPC ............ *G06F 3/0614* (2013.01); *G06F 3/067* (2013.01); *G06F 16/27* (2019.01)

(58) Field of Classification Search
CPC ...... G06F 3/0614; G06F 3/067; G06F 3/0644; G06F 2209/5011; G06F 3/0647; G06F 12/023; G06F 3/061; G06F 3/0689; G06F 16/27
USPC ................................................ 711/100, 114
See application file for complete search history.

(56) References Cited

U.S. PATENT DOCUMENTS

| | | | | |
|---|---|---|---|---|
| 8,429,346 B1* | 4/2013 | Chen | ..................... | G06F 3/0613 709/213 |
| 8,549,243 B2 | 10/2013 | Coronado et al. | | |
| 9,021,296 B1* | 4/2015 | Kiselev | ................... | G06F 16/21 714/6.23 |
| 9,285,994 B2 | 3/2016 | Bish et al. | | |
| 9,424,151 B2 | 8/2016 | Lakshman et al. | | |
| 2003/0231529 A1* | 12/2003 | Hetrick | ............... | G06F 11/1092 365/200 |
| 2013/0124780 A1* | 5/2013 | Baderdinni | ............ | G06F 3/061 711/103 |
| 2016/0026578 A1 | 1/2016 | Benhase et al. | | |
| 2018/0136838 A1* | 5/2018 | White | ..................... | G06F 3/061 |

OTHER PUBLICATIONS

IBM Knowledge Center, "File attributes in SQL expressions", IBM Specturm Scale 4.2.0, known about as early as Jul. 6, 2018, pp. 1-6.

* cited by examiner

*Primary Examiner* — Hashem Farrokh
(74) *Attorney, Agent, or Firm* — Kunzler Bean & Adamson

(57) ABSTRACT

Methods and systems for an enhanced restripe mechanism are provided. A system for an enhanced restriping mechanism includes a data storage module that stripes data across a plurality of storage devices, wherein the plurality of storage devices are arranged into a plurality of storage pools and the data is distributed across the plurality of storage pools. Also, the system may include a movement detection module that detects changes in the arrangement of the plurality of storage devices that would cause the data on a storage device in the plurality of storage devices to be moved onto other storage devices in the plurality of storage devices. Further, the system may include a restriping module that restripes disk data from the storage device in the plurality of storage devices onto the other storage devices in response to the detected change based on access characteristics of the data.

20 Claims, 6 Drawing Sheets

ENHANCED RESTRIPE MECHANISM

FIELD

This invention relates to filesystems and more particularly relates to methods and systems for an enhanced restripe mechanism.

BACKGROUND

Data striping is a technique of segmenting logically sequential data, such as a file, so that consecutive segments are stored on different physical storage devices. By spreading segments across multiple devices which can be accessed concurrently, total data throughput may be increased. Also, data striping may permit balancing an input/output load across an array of disks. Striping may be done by interleaving sequential segments on storage devices in a round-robin fashion from the beginning of the data sequence. In some embodiments, striped data may be restriped in response to certain events. For example, data may be restriped in response to a disk deletion or a data replication change.

SUMMARY

Methods and systems for an enhanced restripe mechanism are provided. A system for an enhanced restriping mechanism includes a data storage module that stripes data across a plurality of storage devices, wherein the one or more storage devices are arranged into a plurality of storage pools and the data is distributed across the plurality of storage pools. Also, the system may include a movement detection module that detects changes in the arrangement of the plurality of storage devices that would cause the data on a storage device in the plurality of storage devices to be moved onto one or more other storage devices in the plurality of storage devices. Further, the system may include a restriping module that restripes disk data from the storage device in the plurality of storage devices onto the one or more other storage devices in response to the detected change based on access characteristics of the data.

In certain embodiments, the restriping module moves the portions of the data from a residence pool to a foreign pool when the access characteristics dictate that a portion of the data originated with the storage device and that the portion of the data was not accessed by the one or more other storage devices. Additionally, the restriping module moves the portions of the data from a residence pool to a foreign pool when the access characteristics dictate that a portion of the data that originated with the one or more storage device and that the portions of the data are primarily accessed by the storage device.

In further embodiments, the access characteristics dictate that the restriping module moves a portion of the data from a residence pool to a foreign pool based on an estimation of future usage. Also, the restriping module calculates the estimation of future usage based on predicting algorithms that predict the future usage of the data by the one or more other storage devices based on past usage patterns.

In some embodiments, the restriping module moves a portion of the data from a residence pool to a foreign pool based on an activity level map. Also, the activity level map dictates heat values for separate portions of the data. Further, the heat values indicate whether the separate portions of the data are hotter or colder in relation to other portions of the separate portions of the data, wherein the restriping module moves the colder portions of the data from the residence pool to the foreign pool.

In certain embodiments, a method includes striping data across a plurality of storage devices, wherein the plurality of storage devices are arranged into a plurality of storage pools and the data is distributed across the plurality of storage pools. The method may also include detecting changes in the arrangement of the plurality of storage devices that would cause the data on a storage device in the plurality of storage devices to be moved onto one or more other storage devices in the plurality of storage devices. Additionally, the method includes restriping disk data from the storage device in the plurality of storage devices onto the one or more other storage devices in response to the detected change based on access characteristics of the data.

In further embodiments, moving the portions of the data from a residence pool to a foreign pool when the access characteristics dictate that a portion of the data originated with the storage device and that the portion of the data was not accessed by the one or more other storage devices. Additionally, moving the portions of the data from a residence pool to a foreign pool when the access characteristics dictate that a portion of the data that originated with the one or more storage device and that the portions of the data are primarily accessed by the storage device.

In some embodiments, the method includes moving a portion of the data from a residence pool to a foreign pool based on an estimation of future usage. Additionally, the estimation of future usage is based on predicting algorithms that predict the future usage of the data by the one or more other storage devices based on past usage patterns.

In further embodiments, the method includes moving a portion of the data from a residence pool to a foreign pool based on an activity level map. Also, the activity level map dictates heat values for separate portions of the data. Further, when the heat values indicate that the separate portions of the data are hotter or colder in relation to other portions of the separate portions of the data, moving the colder portions of the data from the residence pool to the foreign pool.

In certain embodiments, a computer program product comprising a computer-readable storage medium including program instructions embodied therewith, the program instructions executable by a processor to cause the processor to stripe data across a plurality of storage devices, wherein the plurality of storage devices are arranged into a plurality of storage pools and the data is distributed across the plurality of storage pools. Also, the program instructions may cause the processor to detect changes in the arrangement of the plurality of storage devices that would cause the data on a storage device in the plurality of storage devices to be moved onto one or more other storage devices in the plurality of storage devices. Further, the program instructions may cause the processor to restripe disk data from the storage device in the plurality of storage devices onto the one or more other storage devices in response to the detected change based on access characteristics of the data.

In some embodiments, the program instructions may cause the processor to move the portions of the data from a residence pool to a foreign pool when the access characteristics dictate that a portion of the data originated with the storage device and that the portion of the data was not accessed by the one or more other storage devices. Also, the program instructions may cause the processor to move the portions of the data from a residence pool to a foreign pool when the access characteristics dictate that a portion of the data that originated with the one or more storage device and that the portions of the data are primarily accessed by the storage device. Additionally, wherein the access characteristics dictate that the restriping module moves a portion of the data from a residence pool to a foreign pool based on an estimation of future usage or an activity level map.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
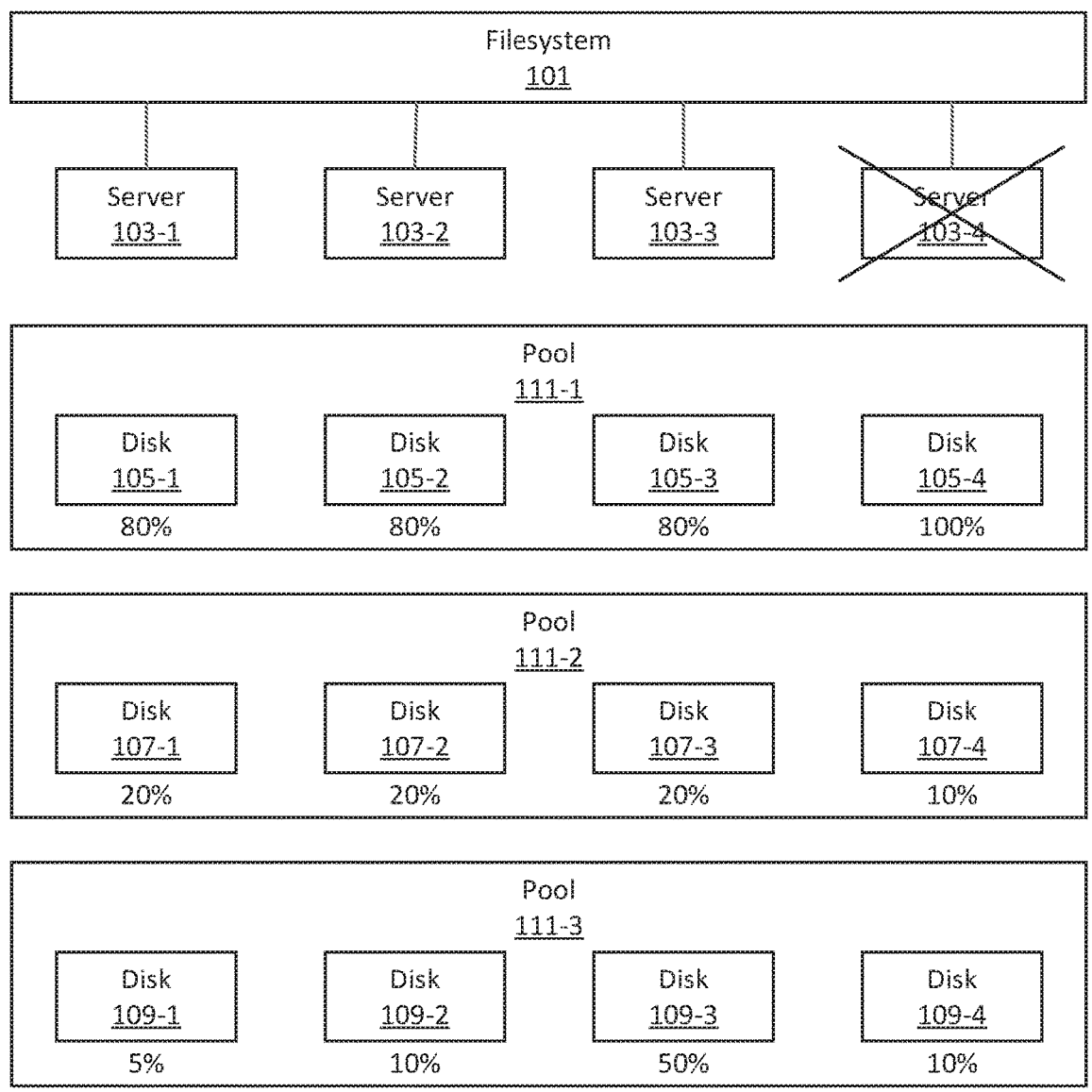
FIG. 1 is a block diagram of one embodiment of a computing system implementing a restriping mechanism.

Disclosed herein are various embodiments providing methods, systems, and computer program products that can provide an enhanced restriping mechanism. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

With reference now to the figures, FIG. 1 is a block diagram of one embodiment of a storage system 100 implementing a restriping mechanism. In certain embodiments, the storage system 100 may include a filesystem 101. As used herein, a filesystem 101 may be a system for organizing and retrieving files from a storage medium. For example, a filesystem 101 may organize data into files that may be arranged into directories and subdirectories or the filesystem 101 may implement another method for organizing files. In certain embodiments, the filesystem 101 may communicate with one or more servers 103-1-103-4 (referred to herein collectively and generally as server or servers 103) that store data on multiple disks. The filesystem 101 may communicate with the servers 103 to acquire data from the disks for presenting information to a user in a manner that is usable and accessible by the user.

In some embodiments, the filesystem 101 may use data striping to store data within the storage system 100. For example, as used herein data striping may be a technique of segmenting logically sequential data, such as a file, such that the consecutive segments are stored on different devices. Data striping may be useful when a processing device requests data more quickly than a single storage device may capably provide the requested data. By implementing data striping, segments of the data may be spread across multiple storage devices, where the multiple storage devices may be accessed concurrently, such that a total data throughput to the processing device may be increased. Further, data striping may also be useful for balancing input/output loads across arrays of storage devices. In certain embodiments, data striping may be performed by interleaving sequential segments of data on storage devices in a round robin fashion from the beginning to the end of a data sequence.

In further embodiments, the storage devices may include any suitable type of storage device or cluster of storage devices that are known or developed in the future that can store computer-usable data. In various embodiments, the storage devices may include one or more non-transitory computer-usable mediums (e.g., readable, writable, etc.), which may include any non-transitory apparatus or device that can contain, store, communicate, propagate, and/or transport instructions, data, computer programs, software, code, routines, etc., for processing by or in connection as directed by the respective site controller.

In certain embodiments, memory storage on the storage devices may be implemented as a direct-access storage devices (DASD). The memory storage, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein. In some embodiments, the storage devices may include a cluster of separate storage devices that are configured to store data. For example, the memory storage may be a network file system, a parallel file system, or other type of file system where multiple computing devices access the memory storage.

In various embodiments, the storage devices may include non-volatile/persistent hardware and/or software configured to perform long-term data storage operations, including, but not limited to, data archiving, data backup, data mirroring, replicating data, etc. For instance, the storage devices may include non-volatile and/or persistent hardware and/or software to perform long-term data storage operations, which may include write operations, read operations, read-write operations, etc., among other operations.

In further embodiments, the filesystem 101 may save data on storage devices that can be arranged into various tiers. In particular, the filesystem 101 may include multiple memory tiers. As used herein, a memory tier may refer to a group of memory storage elements that are associated with one another based on the characteristics of the memory storage elements. In certain embodiments, the different groups of storage elements may be arranged into pools of memory storage elements. For example, the storage system 100 may include a first pool 111-1, a second pool 111-2, and a third pool 111-3 (referred to generally or collectively herein as pool 111 or pools 111).

In certain embodiments, the memory storage elements may be grouped together within a pool 111 based on similar configurations, types of memory, memory transfer speeds, accessibility of the data, and the like. For example, the first pool 111-1 may include the disks 105-1-105-4 (referred to collectively as disks 105), the second pool 111-2 may include the disks 107-1-107-4 (referred to collectively as disks 107), and the third pool 111-3 may include the disks 109-1-109-4 (referred to collectively as disks 109). For example, the disks 105 of the first pool 111-1 may be read or written to faster than data that is read or written to either the disks 107 of the second memory pool 111-2 or the disks 109 of the third memory pool 111-3. Further, the disks 107 of the second pool 111-2 may be read or written to faster than data that is read or written to the disks 109 of the third memory pool 111-3. Accordingly, the first pool 111-1 may form a first memory tier may be a faster memory tier and the second pool 111-2 may form a second memory tier that may be a slower memory tier in relation to the first pool 111-1. For example, the disks 105 may be solid state storage devices (SSD devices). Further, the data may be communicated from the disks 107 using a serial attached SCSI (SAS) protocol and from the disks 109 using a serial advanced technology attachment (SATA) protocol.

In some embodiments, data stored on a particular disk may be restriped. As used herein, data is restriped when data that is striped on a particular storage device is reassigned for storage on another storage device. Restriping data stored on the filesystem 101 may be triggered manually (by user) or automatically triggered. Restriping helps in changing the way data is laid out across multiple disks. Restriping may be performed during disk deletion to reassign data from the disks to be deleted to other disks. Restriping may also be performed during replication changes to help evenly spread replicated blocks across multiple storage elements.

In certain embodiments, the data stored on disks associated with a server 103 may be deleted and the data associated with the server 103 may be restriped onto other disks associated with other servers 103. For example, the server 103-4 may be terminated, where the server 103-4 is associated with the disks 105-4, 107-4, and 109-4. As described above, the disk 105-4 is part of the pool 111-1, the disk 107-4 is part of the pool 111-2, and the disk 109-4 is part of the pool 111-3. Further, the disk 105-4 is 100% in use, the disk 107-4 is 10% in use, and the disk 109-4 is also 10% in use.

The filesystem 101 may then attempt to reassign the data from the disks associated with the server 103-4 onto disks associated with other servers 103 that are in the residence pools 111 of the data of the disks to be deleted. For example, data on the disk 105-4 may be restriped onto disks 105-1-105-3 that are associated with the servers 103-1-103-3 and also in the pool 111-1. Also, data on the disk 107-4 may be restriped onto disks 107-1-107-3 that are associated with the servers 103-1-103-3 and also in the pool 111-2. Further, data on the disk 109-4 may be restriped onto disks 109-1-109-3 that are associated with the servers 103-1-103-3 and also in the pool 111-3.

However, there may not be enough space within the residence pools 111 of the associated disks to accommodate the data from the disks associated with the server 103 to be terminated. As 10% of the disks 107-4 and 109-4 are in use, there may be sufficient space in the associated residence pools 111 to accommodate the restriping of the disks 107-4 and 109-4. In contrast, 100% of the disk 105-4 is in use and each of the disks 105-1-105-3 are 80% in use. Accordingly, the disks 105-1-105-3 do not have sufficient space to accommodate the restriping of the data on the disk 105-4 within the pool 111-1.

In certain embodiments, when there is insufficient space to accommodate the restriping of the data from one disk to other disks in the same residence pool, the storage system 100 may prevent the server 103-4 from being deleted. However, keeping the server 103-4 alive may add to operational expense cost. Also, an end user may maintain the server 103-4 while the server 103-4 is no longer being used by an application. Alternatively, the storage system 100 may move the data associated with the server 103-4 to another storage device. However, moving the data to another storage device may result in additional storage cost beyond the filesystem operating cost. Also, the moving of the data to another storage device may be inefficient in terms of computational and network bandwidth. Additionally, the data associated with the server 103-4 may be deleted. However, deleting the data may result in an increase of workload for the filesystem 101. In particular, the filesystem 101 may identify the data to be deleted and determine that the current delete candidate identification is unaware of the free size required for the restripe operation to succeed. Further, the deletion of the data may negatively impact business.

Figure 2:
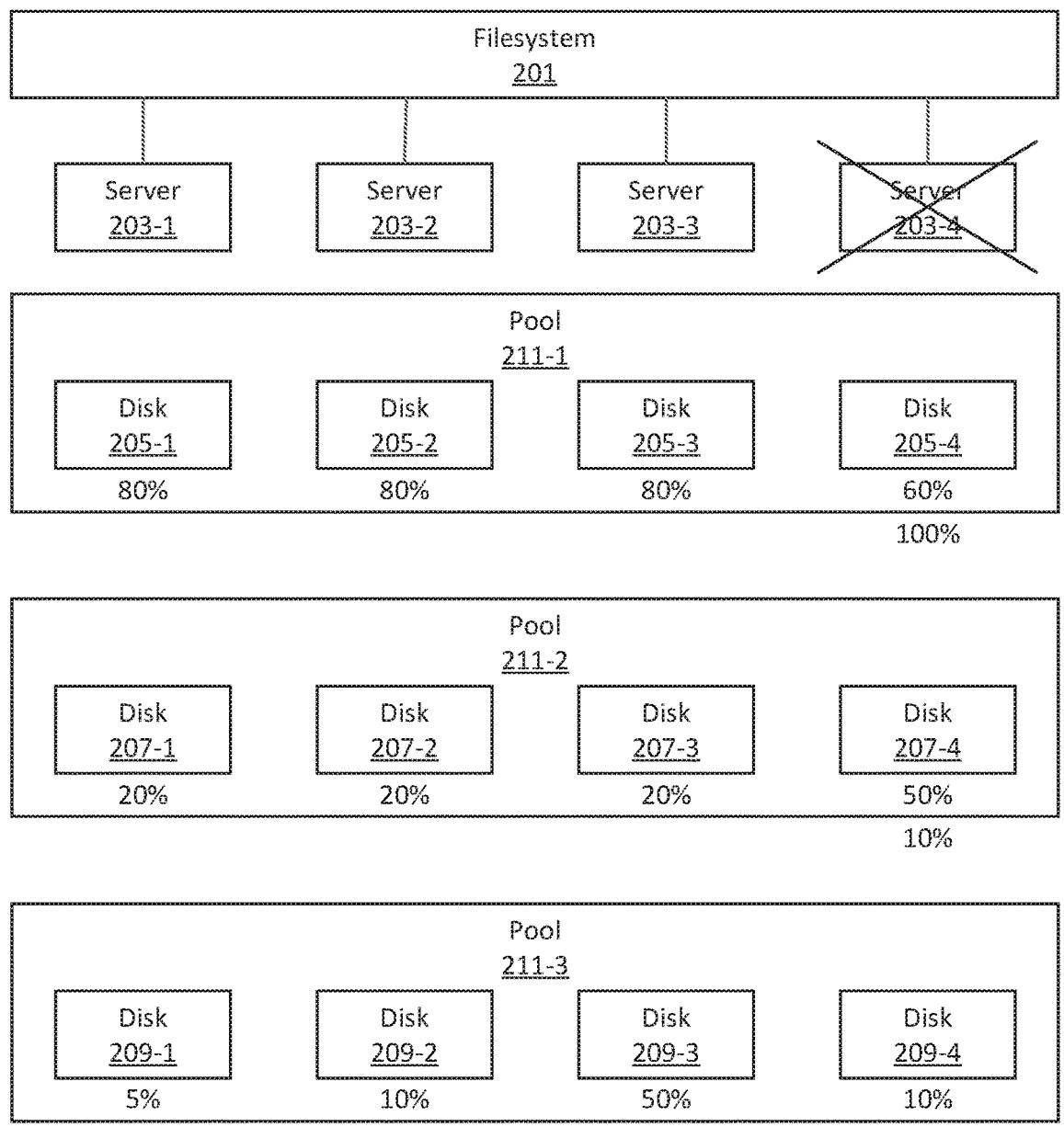
FIG. 2 is a block diagram of one embodiment of a computing system implementing an enhanced restriping mechanism.

FIG. 2 is a block diagram of a further embodiment of a storage system 200 implementing an enhanced restriping mechanism for moving data from one disk associated with a server 203-4 being deleted to other disks in a storage system. In certain embodiments, the filesystem 201 may manage the servers 203, pools 211 and associated disks in a manner similar to the embodiments described above with respect to the storage system 100 of FIG. 1. In contrast to the embodiments described above in FIG. 1, when a server 203 is deleted, data can be migrated from a residence pool 111 to a foreign pool 111 to accommodate the data on the disks associated with the server 203 to be deleted. As used herein, a residence pool 211 generally refers to a pool 211 of the filesystem 201 associated with the disk containing the data to be moved. Further, a foreign pool 211 generally refers to a pool 211 of the filesystem 201 that is not associated with the disk containing the data to be moved. For example, the pool 211-1 may be a residence pool 211 for the disks 205-1-205-4 and the pools 211-2-211-3 may be foreign pools 211 for the disks 205-1-205-4. Also, the pool 211-2 may be a residence pool 211 for the disks 207-1-207-4 and the pools 211-1 and 211-3 may be foreign pools 211 for the disks 207-1-207-4. Additionally, the pool 211-3 may be a residence pool 211 for the disks 209-1-209-4 and the pools 211-1-211-2 may be foreign pools 211 for the disks 209-1-209-4.

In certain embodiments, data can be migrated from the disk to be deleted to a foreign pool 211 such that the residence pool 211 is able to accommodate the data remaining on the disk in the residence pool 211. For example, when the server 203-4 is terminated, the disk 205-4 may be associated with the server 203-4 and accordingly, the data on the disk 205-4 may be moved to another disk to accommodate the termination of the server 203-4. However, the disk 205-4 may originally be 100% in use and the disks 205-1-205-3 may each be 80% in use such that the disks 205-1-205-3 are able to accommodate 60% of the data stored on the disk 205-4. Accordingly, 40% of the data on the disk 205-4 may be migrated to the disk 207-4, where the disk 207-4 is 10% in use before the migration of data from the disk 205-4 to the disk 207-4 and 50% in use after the migration of data from the disk 205-4 to the disk 207-4. After the migration of the data from the disk 205-4 to the disk 207-4, there may be sufficient space within the residence pool 211-1 to accommodate the remaining data in the disk 205-4.

In an alternative embodiment, data can be migrated from disks in the residence pool 211, where the disks are associated with servers 203 that are not to be terminated to accommodate the data on the disk in the residence pool 211 associated with the server 203 to be terminated. For example, when the server 203-4 is terminated, the disk 205-4 may be associated with the server 203-4 and accordingly, the data on the disk 205-4 may be moved to another disk to accommodate the deletion of the server 203-4. However, the disk 205-4 may originally be 100% in use and the disks 205-1-205-3 may each be 80% in use such that the disks 205-1-205-3 are unable to accommodate the data to be migrated from the disk 205-4. Accordingly, data may be migrated from the disks 205-1-205-3 to corresponding disks in foreign pools 211 such that the disks 205-1-205-3 have sufficient space to accommodate the migration of data from the disk 205-4 associated with the server 203-4 that is being terminated.

Figure 3:
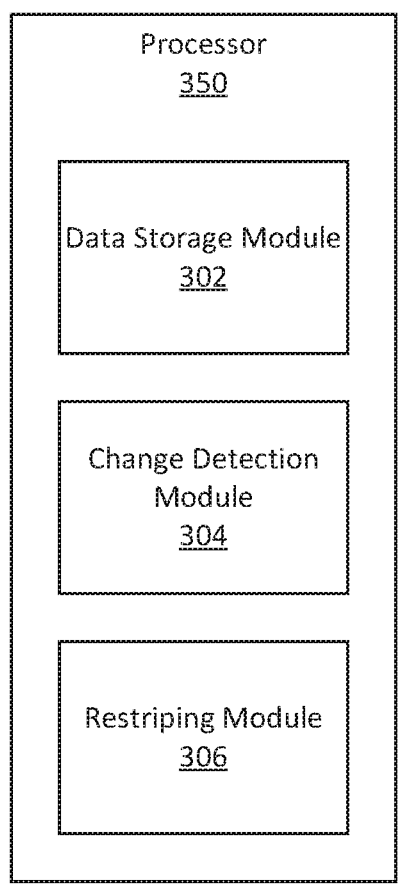
FIG. 3 is a block diagram illustrating an embodiment of a processor configured to provide an enhanced restriping mechanism.

FIG. 3 is a block diagram illustrating an embodiment of a processor 350 for providing an enhanced restriping mechanism. In certain embodiments, as used herein, the processor 350 may be a general-purpose computer, special-purpose computer, multiple processors, or other programmable data processing apparatus. In some embodiments, the processor 350 may be one or more processors on the storage system 201 capable of directing the storage devices such as those described above in connection with FIG. 2. For example, the processor 350 may be part of the storage system 200. In the depicted embodiment, the processor 350 may include a data storage module 301, a change detection module 303, and a restriping module 305. As described herein, the data storage module 301 may stripe data across a plurality of storage devices, where the storage devices are arranged into a plurality of storage pools 211 and the data is distributed across the plurality of storage pools 211. Further, as described herein, the change detection module 304 may detect changes in the configuration of the plurality of storage devices. Additionally, as described herein, the restriping module 306 may restripe disk data from a storage device in the plurality of storage devices onto one or more other storage devices in the plurality of storage devices in response to the detected change based on the access characteristics of the data.

In certain embodiments, the data storage module 302 may stripe data across a plurality of storage devices, where the storage devices are arranged into a plurality of storage pools 211 and the data is distributed across the plurality of storage pools 211. Similar to the storage system 200 described above in FIG. 2, the data storage module stores data on multiple storage devices. Likewise, the data storage module 302 may stripe the data across the multiple storage devices. Also, the data storage module 302 may arrange the multiple storage devices into different pools 211 based on the characteristics of a storage device. As described above, the storage devices may be arranged into different pools 211 based on the rate that data can be accessed from the storage devices. For example, the storage devices may include the disks 205, 207, and 209. The disks 205 may be part of a first pool 211-1, the disks 207 may be part of the second pool 211-2, and the disks 209 may be part of the third pool 211-3.

In some embodiments, the movement detection module 304 may detect changes in the arrangement of the plurality of storage devices that would cause the data on a storage device to be moved onto one or more other storage devices. For example, a server 203 may be terminated and data stored on disks associated with the server 203 to be deleted may be moved to other disks associated with other servers 203. The movement detection module 304 may detect that a server 203 is being terminated and may provide an indication that data on the storage devices associated with the server 203 is to be moved to other storage devices.

In additional embodiments, the restriping module 306 may restripe disk data from the storage device onto other storage devices in response to the detected change based on access characteristics of the data in the storage system 200. In particular, based on the access characteristics of the data, the storage system 200 may determine how to move data in the storage system in order to accommodate the disk data from the disks that are to be removed from the storage system 200 in association with the termination of a server. Data may be moved between the different pools 211 in the storage system 200 such that there is sufficient space to accommodate the disk data from the disks that are to be removed. For example, sufficient disk data on the disk associated with the server 203 to be terminated may be moved to foreign pools 211 such that there is sufficient space in the residence pool 211 to accommodate the remaining disk data on the disk associated with the server 203 to be terminated. Alternatively, sufficient disk data may be moved from disks in the residence pool 211 associated with servers 203 that are not being deleted to foreign pools 211 such that there is sufficient space in the residence pool 211 to accommodate the data on the disk associated with the server 203 to be terminated.

In certain embodiments, the access characteristics of the data may indicate that data is generated by a particular server 203 and not accessed by other servers 203. Also, the access characteristics may indicate that data is generated by other servers 203 but accessed by a particular server 203. Additionally, the access characteristics may indicate a weight for the data. Further, the access characteristics for data may be derived from an activity level map for the data stored on the various disks.

In some embodiments, when the access characteristics indicate that data is generated by a server 203 (in particular a server 203 to be deleted) and not accessed by other servers 203, the data may be moved to another disk in a foreign pool 211. For example, in some parallel, share nothing filesystems, data that is received for storage by a server 203 may be split into multiple chunks and are striped in a round robin fashion. The storage system 200 may maintain a record of which server 203 received the file create request directly by the application or user and are not accessed by other servers 203. Blocks corresponding to these files may be moved to foreign pools 211 when the residence pool 211 lacks sufficient space to accommodate data to be restriped.

In further embodiments, when the access characteristics indicate that data is generated by other servers 203 but accessed by the server 203 to be deleted, the data may be moved to another disk in a foreign pool 211. As described above, the storage system 200 may maintain a record of which server 203 will keep track of the server 203 that received the file create request directly by the application or user and are not accessed by a target server 203. Blocks corresponding to these files will be moved to foreign pools 211 in case the residence pool 211 has insufficient space to accommodate data to be restriped.

In additional embodiments, when the access characteristics indicate a weight for the data stored on the disks of the residence pool 211, data having a lesser weight may be moved from the residence pool 211 to disks in foreign pools 211. The storage system 200 may use predicting algorithms which analyze the past usage patterns and calculate an estimation of future usage, where the estimation of future usage predicts how data on the disks may be used in the future. For example, whether the data is going to be hot and cold, where hot data will be used more often and cold data will be used less often. Blocks that are less likely to be used may be moved to foreign pools 211 if a residence pool 211 has insufficient space to accommodate data to be restriped.

In some embodiments, when the access characteristics for data may be derived from an activity level map for the data stored on the various disks, data may be moved to foreign pools 211 based on the activity level map. For example, the storage system 200 may maintain an activity level map like a heat map, wherein a heat map indicates the activity level at which data has been accessed. Based on the activity levels, the storage system 200 may perform a filesystem scan to identify data that has been accessed at lower activity rates than other portions of the data. The storage system 200 may migrate sufficient data such that there is sufficient space available in the residence pool 211 to accommodate the data to be restriped. When there is sufficient space in the residence pool 211 to accommodate the data to be restriped, the restriping module 306 may perform the restriping operation.

Figure 4:
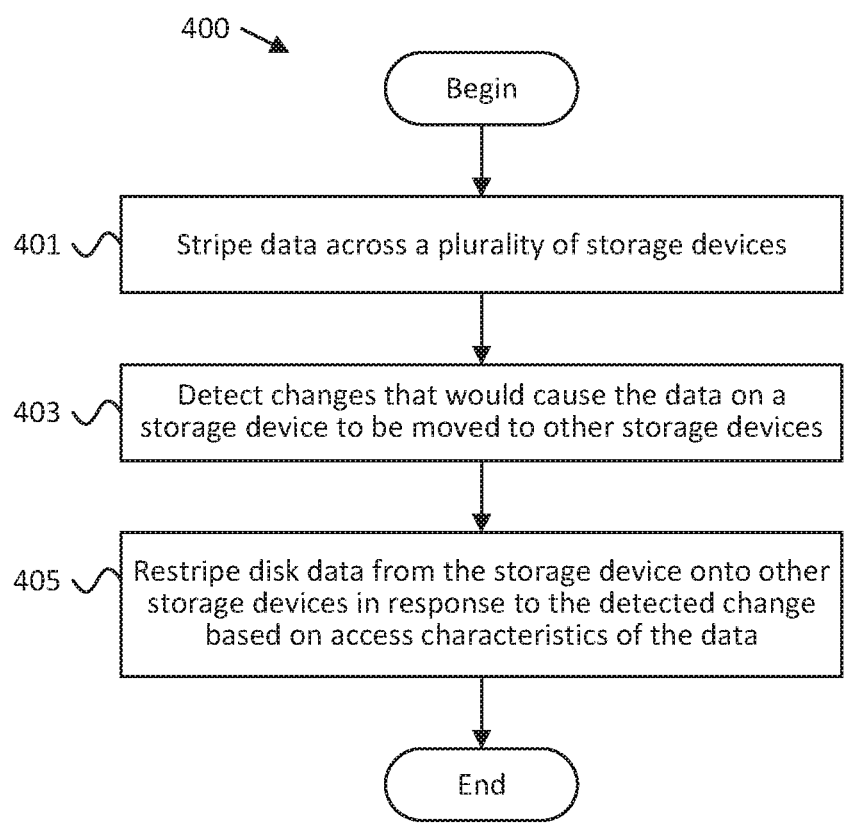
FIG. 4 is a flowchart diagram illustrating one embodiment of a method for providing an enhanced restriping mechanism.

FIG. 4 is a flow chart diagram illustrating one embodiment of a method 400 for providing an enhanced restriping mechanism. Method 400 begins at 401, where data is striped across a plurality of storage devices. Method 400 proceeds at 403, where changes are detected that would cause the data on a storage device to be moved to other storage devices. Further, method 400 proceeds at 405, where disk data is restriped from the storage device onto other storage devices in response to the detected change based on access characteristics of the data. Method 400 then ends.

Figure 5:
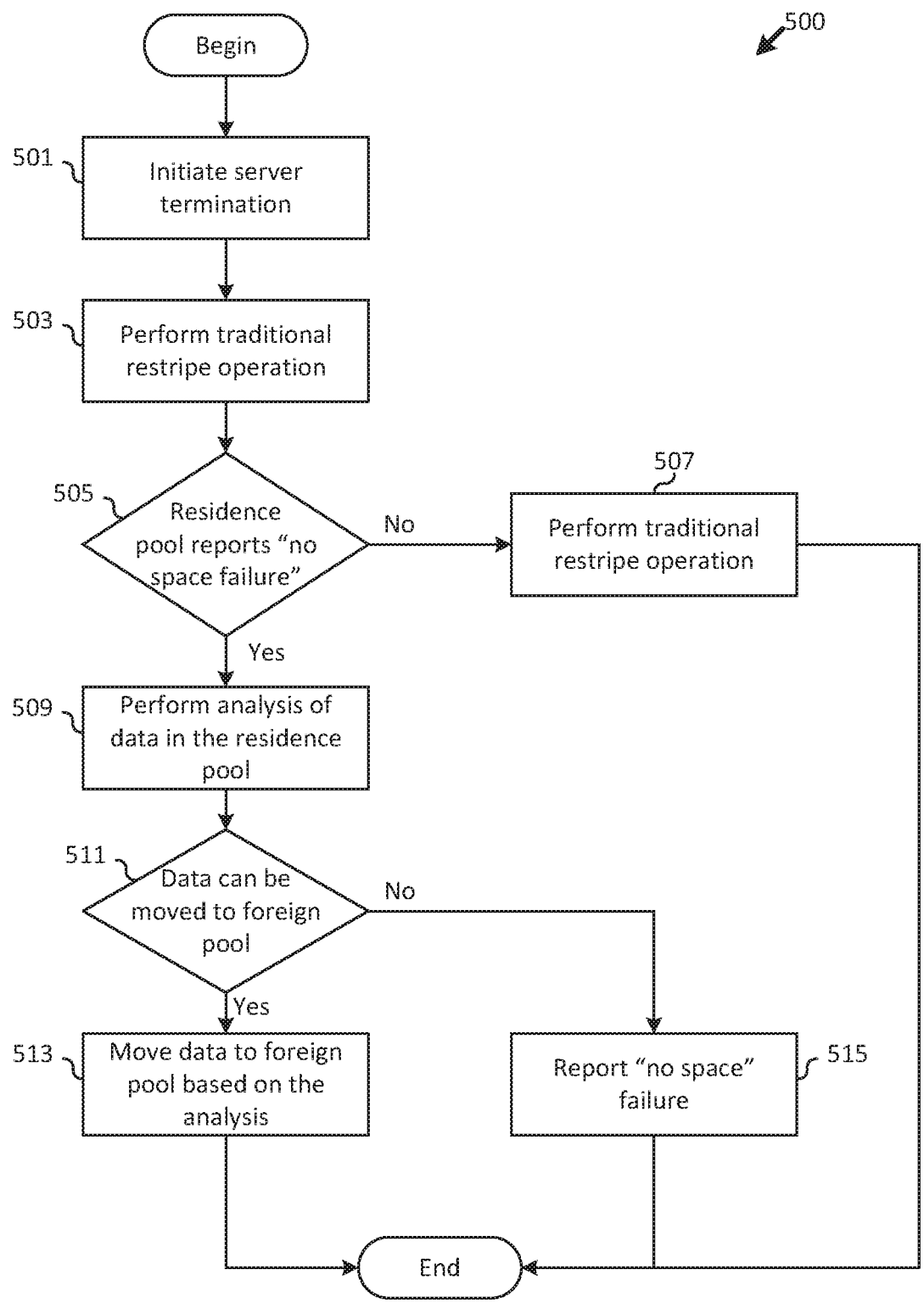
FIG. 5 is a flowchart diagram illustrating an embodiment of a further method for determining whether to move data to foreign pools.

FIG. 5 is a flow chart diagram illustrating a further embodiment of a method 500 for determining whether to move data to a foreign pool 211. Method 500 begins at 501, where a server termination is initiated. For example, a server 203 associated with a filesystem 201 may be terminated. When the server 203 is terminated, data on disks associated with the server 203 may be moved to other disks associated with other servers 203 in the filesystem 201. Accordingly, the method 500 proceeds at 503, where a traditional restripe operation may be performed. For example, when a traditional restripe operation is performed, the storage system 200 may attempt to move the data on disks associated with the server 203 to be terminated onto disks associated with servers 203 that are being maintained. Also, the storage system 200 may attempt to move the data onto disks that are in the residence pool 211 of the disk from which the data is being moved.

In certain embodiments, the method 500 proceeds at 505, where the storage system 200 determines whether the residence pool 211 reports a "no space" failure. For example, a "no space" failure may indicate that the other disks in the residence pool 211 have insufficient space to accommodate the data on the disk associated with the server 203 to be deleted. If the storage system 200 does not receive a "no space" failure, the method 500 proceeds at 507, where a traditional restripe operation is performed. When the data is restriped to the other disks in the residence pool 211, the method 500 ends.

In a further embodiment, when the storage system 200 receives the "no space" failure, the method 500 proceeds at 509, where the storage system 200 performs an analysis of data in the residence pool 211. The method 500 then proceeds at 511, where the storage system 200 determines whether data can be moved to the foreign pools 211 based on the analysis of the data. If the storage system 200 determines that the data is unable to be moved to a foreign pool 211, the method 500 proceeds at 515, where the storage system 200 reports the "no space" failure. After the storage system 200 reports the "no space" failure, the method 500 ends. Alternatively, when the storage system 200 determines that the data can be moved to the foreign pool 211, the method 500 proceeds at 513 where the data is moved to foreign pools 211 based on the analysis. After the data is moved to foreign pools 211, the method 500 ends and the data can then be restriped in a traditional manner.

Figure 6:
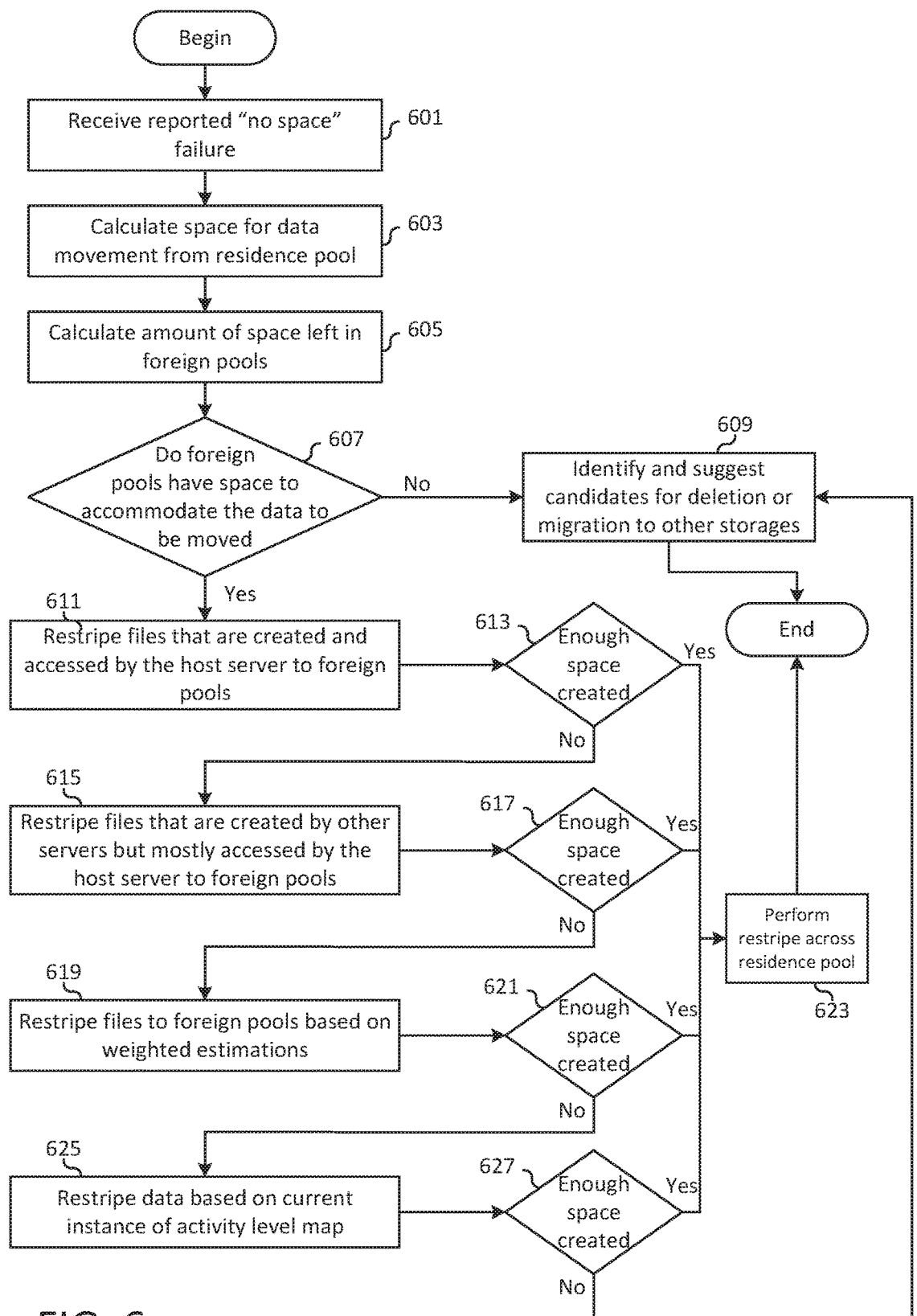
FIG. 6 is a flowchart diagram illustrating an embodiment of a further method for determining what data to move to foreign pools.

FIG. 6 is a flow chart diagram illustrating a further embodiment of a method 600 for determining what data is to be moved to a foreign pool 211. The method 600 begins at 601, where a reported "no space" failure is received. Upon reception of the "no space" failure, the method 600 may proceed at 603, where the space for data movement from a residence pool 211 is calculated. For example, the storage system 200 may calculate the amount of data to be moved from the disk associated with the server 203 to be deleted. The storage system 200 may then calculate the amount of available space in the residence pool 211. Additionally, the storage system 200 may determine that the space for data movement from the residence pool 211 may be equal to the amount of data to be moved that is greater than the amount of available space in the residence pool 211.

In further embodiments, the method 600 may proceed at 605 where the amount of space left in foreign pools 211 is calculated. When the data to be moved is calculated and the amount of space available in the foreign pools 211 is calculated, the method 600 may determine at 607, whether the foreign pools 211 have space to accommodate the data to be moved. For example, the storage system 200 may determine that the foreign pools 211 have space to accommodate the data to be moved when the space available in the foreign pools 211 is greater than the data to be moved.

In additional embodiments, when there is sufficient space to accommodate the data to be moved, the method 600 proceeds at 611, where files that are created and accessed by the host server 203 are restriped to foreign pools 211. For example, the storage system 200 may identify data that is on the server 203 to be terminated. The storage system 200 may then identify data that was created by the server 203 and accessed by the server 203 to be terminated and then move the identified data to the foreign pools 211. When the storage system has moved the data to the foreign pools 211, the method 600 may proceed to 613, where the method 600 may determine whether enough space has been created. If enough space has been created, the method 600 proceeds at 623, where a data restripe is performed across residence pools 211. For example, the remaining data on a disk associated with the server 203 to be terminated may be restriped onto other disks in the residence pool 211 of the disk associated with the server.

If the method 600, determines that not enough space has been created, the method 600 proceeds at 615, where files that are created by other servers but mostly accessed by the host server 203 are restriped to foreign pools 211. For example, the storage system 200 may identify data that is on the server 203 to be terminated. The storage system 200 may then identify data that was created by servers other than the server 203 to be terminated and accessed by the server 203 to be terminated and then move the identified data to the foreign pools 211. When the storage system has moved the data to the foreign pools 211, the method 600 may proceed to 617, where the method 600 may determine whether enough space has been created. If enough space has been created, the method 600 proceeds at 623, where a data restripe is performed across residence pools 211.

In further embodiments, if the method 600, determines that not enough space has been created, the method 600 proceeds at 619, where files are restriped to foreign pools 211 based on weighted estimations. For example, the storage system 200 may estimate weights about the data within the residence pool 211, where the weights may predict the likelihood that data may be accessed and estimate the rate at which the data may be accessed. Data that is unlikely to be accessed and/or be accessed at a rate that is less than other data in the residence pool 211 may be moved to foreign pools 211. When the storage system has moved the data to the foreign pools 211, the method 600 may proceed to 621, where the method 600 may determine whether enough space has been created. If enough space has been created, the method 600 proceeds at 623, where a data restripe is performed across residence pools 211.

In certain embodiments, if the method 600, determines that not enough space has been created, the method 600 proceeds at 625, where data is restriped based on a current instance of an activity level map. For example, the storage system 200 may maintain an activity level map, such as a heat map, that indicates the current activity levels. The storage system 200 may determine the activity levels of the different portions of data in the residence pool 211 in relation to each other. The storage system 200 may move data having lesser activity levels to foreign pools 211. When the storage system has moved the data to the foreign pools 211, the method 600 may proceed to 627, where the method 600 may determine whether enough space has been created. If enough space has been created, the method 600 proceeds at 623, where a data restripe is performed across residence pools 211.

In additional embodiments, if the method 600 determines that not enough space has been created, the method 600 proceeds at 609, where candidates for deletion or migration to other storages is identified and suggested. Additionally, returning to 607, the method 600 may determine that the foreign pools 211 lack sufficient space to accommodate the data to be moved, the method 600 may also proceed at 609, where candidates for deletion or migration to other storages is identified and suggested. The method 600 then ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a data storage module that stripes data from a plurality of storage devices across a plurality of storage disks, wherein:
   the plurality of storage disks is arranged into a plurality of storage pools, striping first data from a first storage device in the plurality of storage devices across the plurality storage disks comprises distributing portions of the first data across a first set of storage disks in the plurality of storage disks, and each of the plurality of storage pools includes at least one storage disk in the first set of storage disks such that a first storage pool in the plurality of storage pools includes at least a first storage disk of the first set of storage disks;

a movement detection module that detects changes in each of the plurality of storage devices, wherein a change in the first storage device causes a portion of the first data stored on the first storage disk in the first storage pool to be moved; and onto a restriping module that:

restripes the portion of the first data from the first storage disk in the first storage pool onto one or more remaining storage disks in the first storage pool in response to determining that the one or more remaining storage disks in the first storage pool include sufficient storage space to store the portion of the first data, and restripes a first part of the portion of the first data from the first storage disk in the first storage pool onto the one or more remaining storage disks in the first storage pool and migrates a remaining part of the portion of the first data to one or more other storage disks of one or more other storage pools in response to determining that the one or more remaining storage disks in the first storage pool include sufficient storage space to store the first part of the portion of the first data and insufficient storage space to store the remaining part of the portion of the first data.

2. The system of claim 1, wherein:

migrating the remaining part of the portion of the first data to the one or more other storage disks of the one or more other storage pools comprises moving the remaining part of the portion of the first data from a residence pool to a foreign pool; and the restriping module moves the first part of the portion from the residence pool to the foreign pool in response to one of:

the first part of the portion of the first data originated with the first storage device and the first part of the portion of the first data was not accessed by the one or more other storage devices in the plurality of storage devices, an estimation of future usage for the remaining part of the portion of the first data, and an activity level map indicating an activity level for the remaining part of the portion of the first data.

3. The system of claim 2, wherein:

the first part of the portion is moved from the residence pool to the foreign pool in response to the estimation of future usage; and the restriping module calculates the estimation of future usage based on predicting algorithms that predict the future usage of the first part of the portion by the one or more other storage devices in the plurality of storage devices based on past usage patterns of the first part of the portion.

4. The system of claim 2, wherein the activity level map dictates heat values for separate parts of the portion of the first data.

5. The system of claim 4, wherein:

the heat values indicate whether each part of the portion of the first data is hotter or colder in relation to other parts of the portion of the first data; and the restriping module is further configured to move relatively colder parts of the portion of the first data from the residence pool to the foreign pool before moving relatively hotter parts.

6. The system of claim 1, wherein the restriping module is further configured to migrate second data stored on the one or more remaining storage disks in the first storage pool to one or more other storage disks in one or more other storage pools in response to determining that the one or more remaining storage disks in the first storage pool include insufficient storage space to store the portion of the first data.

7. The system of claim 6, wherein:

a first amount of the second data is greater than or equal to a second amount of the portion of the first data;

migrating the second data to the one or more other storage disks in the one or more other storage pools frees up the sufficient storage space in the one or more remaining storage disks in the first storage pool to store the portion of the first data; and the restriping module is further configured to restripe the portion of the first data from the first storage disk onto the one or more remaining storage disks in the first storage pool in response to the sufficient storage space being freed up in the one or more remaining storage disks in the first storage pool.

8. The system of claim 1, wherein the restriping module is further configured to delete the remaining part of the portion of the first data in response to determining that the one or more other storage disks of the one or more other storage pools include insufficient storage space to store the remaining part of the portion of the first data.

9. A method comprising:

striping, by a processor, first data from a first storage device in a plurality of storage devices across a plurality storage disks arranged into a plurality of storage pools by distributing portions of the first data across a first set of storage disks in the plurality of storage disks, wherein each of the plurality of storage pools includes at least one storage disk in the first set of storage disks such that a first storage pool in the plurality of storage pools includes at least a first storage disk of the first set of storage disks;

detecting a change in the first storage device that causes a portion of the first data stored on the first storage disk in the first storage pool to be moved; and performing one of:

restriping the portion of the first data from the first storage disk in the first storage pool onto one or more remaining storage disks in the first storage pool in response to determining that the one or more remaining storage disks include sufficient storage space to store the portion of the first data, and restriping a first part of the portion of the first data from the first storage disk in the first storage pool onto the one or more remaining storage disks in the first storage pool and migrate a remaining part of the portion of the first data to one or more other storage disks of one or more other storage pools in response to determining that the one or more remaining storage disks in the first storage pool include sufficient storage space to store the first part of the portion of the first data and insufficient storage space to store the remaining part of the portion of the first data.

10. The method of claim 9, wherein:
migrating the remaining part of the portion of the first data to the one or more other storage disks of the one or more other storage pools comprises moving the remaining part of the portion of the first data from a residence pool to a foreign pool; and the remaining part of the portion of the first data is moved from the residence pool to the foreign pool in response to one of:
- the first part of the portion of the first data originated with the first storage device and the first part of the portion of the first data was not accessed by the one or more other storage devices in the plurality of storage devices,
- an estimation of future usage for the remaining part of the portion of the first data, and
- an activity level map indicating an activity level for the remaining part of the portion of the first data.

11. The method of claim 10, wherein:
the first part of the portion is moved from the residence pool to the foreign pool in response to the estimation of future usage; and
the estimation of future usage is based on calculations in one or more predicting algorithms that predict the future usage of the first part of the portion by the one or more other storage devices in the plurality of storage devices based on past usage patterns of the first part of the portion.

12. The method of claim 10, wherein the activity level map dictates heat values for each part of the portion of the first data.

13. The method of claim 12, wherein the heat values indicate whether each part of the portion of the first data is hotter or colder in relation to other parts of the portion of the first data, the method further comprising:
moving relatively colder parts of the portion of the first data from the residence pool to the foreign pool before moving relatively hotter parts.

14. The method of claim 9, further comprising:
migrating second data stored on the one or more remaining storage disks in the first storage pool to one or more other storage disks in one or more other storage pools in response to determining that the one or more remaining storage disks in the first storage pool include insufficient storage space to store the portion of the first data.

15. The method of claim 14, wherein:
a first amount of the second data is greater than or equal to a second amount of the portion of the first data;
migrating the second data to the one or more other storage disks in the one or more other storage pools frees up the sufficient storage space in the one or more remaining storage disks in the first storage pool to store the portion of the first data; and
the method further comprises restriping the portion of the first data from the first storage disk onto the one or more remaining storage disks in the first storage pool in response to the sufficient storage space being freed up in the one or more remaining storage disks in the first storage pool.

16. The method of claim 9, further comprising:
deleting the remaining part of the portion of the first data in response to determining that the one or more other storage disks of the one or more other storage pools include insufficient storage space to store the remaining part of the portion of the first data.

17. A computer program product comprising a computer-readable storage medium including program instructions embodied therewith, the program instructions executable by a processor to cause the processor to:
stripe first data from a first storage device in a plurality of storage devices across a plurality storage disks arranged into a plurality of storage pools by distributing portions of the first data across a first set of storage disks in the plurality of storage disks, wherein each of the plurality of storage pools includes at least one storage disk in the first set of storage disks such that a first storage pool in the plurality of storage pools includes at least a first storage disk of the first set of storage disks;
detect a change in the first storage device that causes a portion of the first data stored on the first storage disk in the first storage pool to be moved; and
perform one of:
- restripe the portion of the first data from the first storage disk in the first storage pool onto the one or more remaining storage disks in the first storage pool in response to determining that the one or more remaining storage disks include sufficient storage space to store the portion of the first data, and
- restripe a first part of the portion of the first data from the first storage disk in the first storage pool onto the one or more remaining storage disks in the first storage pool and migrate a remaining part of the portion of the first data to one or more other storage disks of one or more other storage pools in response to determining that the one or more remaining storage disks include sufficient storage space to store the first of the portion of the first data and insufficient storage space to store the remaining part of the portion of the first data.

18. The computer program product of claim 17, wherein:
migrating the remaining part of the portion of the first data to the one or more other storage disks of the one or more other storage pools comprises moving the remaining part of the portion of the first data from a residence pool to a foreign pool; and the remaining part of the portion of the first data is moved from the residence pool to the foreign pool in response to one of:
- the first part of the portion of the first data originated with the first storage device and the first part of the portion of the first data was not accessed by the one or more other storage devices in the plurality of storage devices,
- an estimation of future usage for the remaining part of the portion of the first data, and
- an activity level map indicating an activity level for the remaining part of the portion of the first data.

19. The computer program product of claim 17 wherein the program instructions further cause the processor to:
migrate second data stored on the one or more remaining storage disks in the first storage pool to one or more other storage disks in one or more other storage pools in response to determining that the one or more remaining storage disks in the first storage pool include insufficient storage space to store the portion of the first data, wherein:
a first amount of the second data is greater than or equal to a second amount of the portion of the first data, and
migrating the second data to the one or more other storage disks in the one or more other storage pools frees up the sufficient storage space in the one or more remaining storage disks in the first storage pool to store the portion of the first data; and restripe the portion of the first data from the first storage disk onto the one or more remaining storage disks in the first storage pool in response to the sufficient storage space being freed up in the one or more remaining storage disks in the first storage pool.

20. The computer program product of claim 17, wherein the program instructions further cause the processor to:

delete the remaining part of the portion of the first data in response to determining that the one or more other storage disks of the one or more other storage pools include insufficient storage space to store the remaining part of the portion of the first data.

* * * * *